B. OMOTO.
WRENCH.
APPLICATION FILED NOV. 15, 1915.
1,173,458.
Patented Feb. 29, 1916.
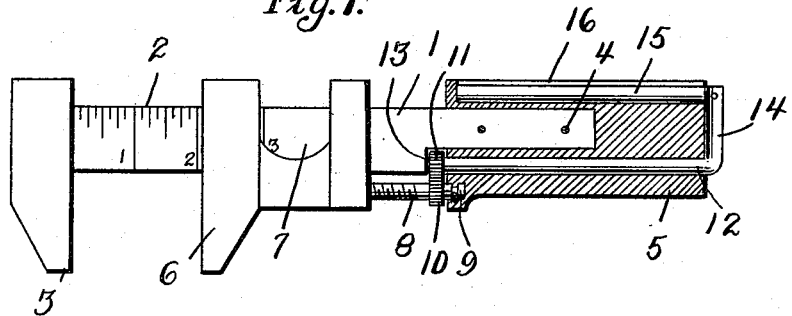
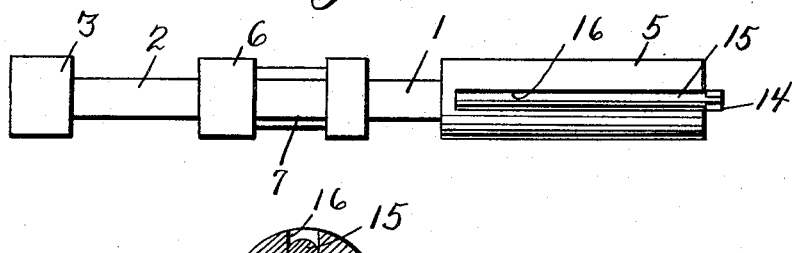
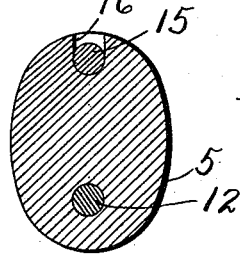
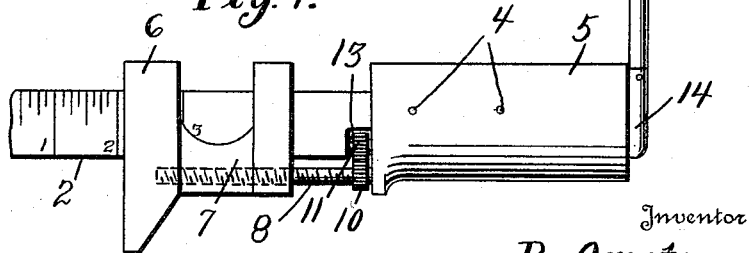
Witnesses
Arthur K. Moore
D. L. Morris
Inventor
B. Omoto
By
Attorneys

UNITED STATES PATENT OFFICE.

BUNNOSUKE OMOTO, OF GRANGER, WYOMING.

WRENCH.

1,173,458.

Specification of Letters Patent. Patented Feb. 29, 1916.

Application filed November 15, 1915. Serial No. 61,564.

*To all whom it may concern:*

Be it known that I, BUNNOSUKE OMOTO, a citizen of the United States, residing at Granger, in the county of Sweetwater, State of Wyoming, have invented certain new and useful Improvements in Wrenches; and I do hereby declare the following to be a full, clear, and exact description of the invention, such as will enable others skilled in the art to which it appertains to make and use the same.

This invention relates to new and useful improvements in wrenches.

An object of the invention resides in the provision of a wrench which may be quickly adjusted to the desired point before being applied to the nut on which it is to operate.

With this and other objects in view, such as will appear as my description progresses, my invention comprises the combination and arrangement of parts as set forth in and falling within the scope of the appended claims.

In the drawing: Figure 1 is a side elevation of a device constructed in accordance with my invention with a portion of the main handle broken away to show the locking handle in its locking position; Fig. 2 is a plan view of the same; Fig. 3 is a transverse section through the handle, and Fig. 4 is an elevational view showing the locking handle disengaged from the receiving chamber in the main handle.

In the embodiment of the invention shown in the drawing, I have illustrated an elongated shank 1 which is rectangular in cross section and which is provided with graduations 2 which are engraved upon one of its edges. Formed integrally with the shank 1 is a stationary jaw 3. Secured to the end of the shank by rivets 4 is a substantially cylindrical handle 5. A movable jaw 6 is mounted upon the shank 1 and is provided with a cut-out portion 7 through which the graduations 2 may be observed. In order that this movable jaw 6 may be adjusted with relation to the jaw 3, I have provided a screw 8 which extends into and is in threaded engagement with the movable jaw 6 and which is provided with a trunnion 9 on the end adjacent the handle 5, which trunnion is mounted, rotatably, in the handle. A gear wheel 10 is formed upon this screw 8 and meshes with a second gear 11. This latter gear is mounted on one end of a shaft 12 and is located in a chamber 13 formed in the shank 1 adjacent the handle 5. This shaft 12 extends completely through the handle 5, is rotatable therein and is provided with an angularly extending portion 14 adjacent the free end of the handle. Hinged to the end of this angularly extending portion 14 is a locking handle 15 which is adapted to swing so as to lie in alinement with the said portion or so as to extend at right angles thereto. The handle 5 is provided with a longitudinally extending chamber 16 for the reception of the locking handle 15. The relation of the gears 10 and 11 is such that when the shaft 12 is rotated once, the movable jaw 6 will be moved a predetermined distance, which distance may be of course varied by varying the relation of the gears. The locking handle 15 is particularly advantageous in that when it is located in the chamber 16 it will maintain the movable jaw 6 positively in its adjusted position. Furthermore the shaft 12 may be rotated, conveniently, by means of this locking handle 15.

In operating the device the locking handle 15 is disengaged from the chamber 16 and the shaft rotated until the jaw 6 is moved to the desired position, at which time the handle 15 may be swung into the chamber 16, will be maintained therein by the hand of the operator, and will secure the movable jaw in its adjusted position.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In a wrench of the class described, the combination with a shank having a jaw on one end thereof and a handle on the other end, of a movable jaw on said shank, a screw rotatably mounted in said handle and in screw threaded engagement with the jaw, a shaft rotatably mounted in the handle, intermeshing gears on the said shaft and screw, and a locking handle hinged to the end of the said shaft, the first mentioned handle having a chamber therein for the reception of the locking handle.

2. In a wrench of the class described, the combination with a shank having a jaw on one end thereof, of a movable jaw on the shank, means including a shaft for moving said jaw and a locking handle hinged to the end of the shaft, the said wrench including also a chamber for receiving the locking handle.

In testimony whereof, I affix my signature, in the presence of two witnesses.

BUNNOSUKE OMOTO.

Witnesses:
KIKUJIRO SATO,
HENRY BOSTON.

Copies of this patent may be obtained for five cents each, by addressing the "Commissioner of Patents, Washington, D. C."